(12) United States Patent
Goldner et al.

(10) Patent No.: US 9,158,032 B2
(45) Date of Patent: *Oct. 13, 2015

(54) OPTICAL DETECTION SYSTEMS AND METHODS OF USING THE SAME

(75) Inventors: Eric Lee Goldner, Valencia, CA (US); Gerald Robert Baker, West Hills, CA (US); James Kengo Andersen, Westlake Village, CA (US); Agop Hygasov Cherbettchian, Santa Monica, CA (US)

(73) Assignee: US Seismic Systems, Inc., Chatsworth, CA (US)

( * ) Notice: Subject to any disclaimer, the term of this patent is extended or adjusted under 35 U.S.C. 154(b) by 433 days.

This patent is subject to a terminal disclaimer.

(21) Appl. No.: 13/577,070

(22) PCT Filed: Feb. 11, 2011

(86) PCT No.: PCT/US2011/024465
§ 371 (c)(1),
(2), (4) Date: Oct. 19, 2012

(87) PCT Pub. No.: WO2011/103032
PCT Pub. Date: Aug. 25, 2011

(65) Prior Publication Data
US 2013/0201484 A1 Aug. 8, 2013

Related U.S. Application Data

(60) Provisional application No. 61/338,466, filed on Feb. 18, 2010, provisional application No. 61/367,515, filed on Jul. 26, 2010.

(51) Int. Cl.
*G01B 9/02* (2006.01)
*G01V 8/10* (2006.01)
(Continued)

(52) U.S. Cl.
CPC ............... *G01V 8/10* (2013.01); *G01B 11/161* (2013.01); *G01V 1/226* (2013.01); *G01V 8/24* (2013.01)

(58) Field of Classification Search
CPC . G01B 11/161; G01D 5/353; G01D 5/35303; G01D 5/35306; G01V 1/16; G01V 1/18
USPC ................................................... 356/483, 478
See application file for complete search history.

(56) References Cited

U.S. PATENT DOCUMENTS 4,155,005 A 5/1979 Knowlton et al.
4,255,015 A 3/1981 Adams et al.
(Continued)

FOREIGN PATENT DOCUMENTS

CN 2643296 9/2004
CN 101199413 6/2008
(Continued)

OTHER PUBLICATIONS

International Search Report for International Application No. PCT/US2010/025248 issued by the Korean Intellectual Property Office on Oct. 11, 2011.

(Continued)

*Primary Examiner* — Jonathan Hansen
(74) *Attorney, Agent, or Firm* — Stradley Ronon Stevens & Young LLP

(57) ABSTRACT

An optical detection system. The optical detection system includes a host node having (a) an optical source for generating optical signals, and (b) an optical receiver. The optical detection system also includes a plurality of fiber optic sensors for converting at least one of vibrational and acoustical energy to optical intensity information, each of the fiber optic sensors having: (1) at least one length of optical fiber configured to sense at least one of vibrational and acoustical energy; (2) a reflector at an end of the at least one length of optical fiber; and (3) a field node for receiving optical signals from the host node, the field node transmitting optical signals along the at least one length of optical fiber, receiving optical signals back from the at least one length of optical fiber, and transmitting optical signals to the optical receiver of the host node.

19 Claims, 12 Drawing Sheets

(51) Int. Cl.
*G01V 1/22* (2006.01)
*G01V 8/24* (2006.01)
*G01B 11/16* (2006.01)

(56) References Cited

U.S. PATENT DOCUMENTS

| | | | |
|---|---|---|---|
| 4,292,628 | A | 9/1981 | Sadler |
| 4,800,267 | A | 1/1989 | Freal et al. |
| 4,826,322 | A | 5/1989 | Philips |
| 4,879,755 | A | 11/1989 | Stolarczyk et al. |
| 4,893,930 | A | 1/1990 | Garrett et al. |
| 4,994,668 | A | 2/1991 | Lagakos et al. |
| 5,011,262 | A | 4/1991 | Layton |
| 5,051,799 | A | 9/1991 | Paul et al. |
| 5,172,117 | A | 12/1992 | Mills et al. |
| 5,227,857 | A | 7/1993 | Kersey |
| 5,367,376 | A | 11/1994 | Lagakos et al. |
| 5,397,891 | A | 3/1995 | Udd et al. |
| 5,493,390 | A | 2/1996 | Varasi et al. |
| 5,680,489 | A | 10/1997 | Kersey |
| 5,712,932 | A | 1/1998 | Alexander et al. |
| 5,798,834 | A | 8/1998 | Brooker |
| 5,986,749 | A | 11/1999 | Wu et al. |
| 6,104,492 | A | 8/2000 | Giles et al. |
| 6,157,711 | A | 12/2000 | Katz |
| 6,281,976 | B1 | 8/2001 | Taylor et al. |
| 6,328,837 | B1 | 12/2001 | Vohra et al. |
| 6,381,048 | B1 | 4/2002 | Chraplyvy et al. |
| 6,453,022 | B1 | 9/2002 | Weinman, Jr. |
| 6,498,652 | B1 * | 12/2002 | Varshneya et al. ............ 356/477 |
| 6,654,521 | B2 | 11/2003 | Sheng et al. |
| 6,819,812 | B2 | 11/2004 | Kochergin et al. |
| 6,891,621 | B2 | 5/2005 | Berg et al. |
| 6,900,726 | B2 | 5/2005 | Graves |
| 7,013,729 | B2 | 3/2006 | Knudsen et al. |
| 7,282,697 | B2 | 10/2007 | Thomas et al. |
| 7,683,312 | B2 | 3/2010 | Goldner et al. |
| 7,840,105 | B2 | 11/2010 | Goldner et al. |
| 7,994,469 | B2 | 8/2011 | Goldner et al. |
| 7,999,946 | B2 | 8/2011 | Andersen et al. |
| 2002/0063866 | A1 | 5/2002 | Kersey et al. |
| 2002/0064331 | A1 | 5/2002 | Davis et al. |
| 2002/0064332 | A1 | 5/2002 | Martin |
| 2003/0094281 | A1 | 5/2003 | Tubel |
| 2003/0145654 | A1 | 8/2003 | Knudsen et al. |
| 2004/0046111 | A1 | 3/2004 | Swierkowski |
| 2004/0060697 | A1 | 4/2004 | Tilton |
| 2004/0246816 | A1 | 12/2004 | Ogle |
| 2005/0076713 | A1 | 4/2005 | Knudsen |
| 2005/0097955 | A1 | 5/2005 | Berg et al. |
| 2005/0111788 | A1 | 5/2005 | Tsuyama |
| 2006/0120675 | A1 | 6/2006 | Goldner et al. |
| 2007/0024857 | A1 * | 2/2007 | Menezo ........................ 356/478 |
| 2007/0065149 | A1 | 3/2007 | Stevens et al. |
| 2008/0137589 | A1 | 6/2008 | Barrett |
| 2009/0101800 | A1 | 4/2009 | Goldner et al. |
| 2009/0140852 | A1 | 6/2009 | Stolarczyk et al. |
| 2009/0210168 | A1 | 8/2009 | Vincelette |
| 2010/0005860 | A1 | 1/2010 | Coudray et al. |
| 2010/0219334 | A1 | 9/2010 | LeGrand |
| 2013/0025375 | A1 * | 1/2013 | Goldner et al. .................. 73/655 |
| 2013/0034351 | A1 * | 2/2013 | Goldner et al. .................. 398/25 |

FOREIGN PATENT DOCUMENTS

| | | |
|---|---|---|
| JP | 2001-221684 | 8/2001 |
| JP | 2006-172339 | 6/2006 |
| JP | 2007-232515 | 9/2007 |
| KR | 10-1997-0002776 | 1/1997 |
| KR | 10-2002-0008457 | 1/2002 |
| WO | 99/05493 | 2/1999 |
| WO | 2011/050227 | 4/2011 |

OTHER PUBLICATIONS

International Search Report for International Application No. PCT/US2010/053659 issued by the Korean Intellectual Property Office on Aug. 2, 2011.

International Search Report for International Application No. PCT/US2010/053763 issued by the Korean Intellectual Property Office on Jul. 28, 2011.

International Search Report for International Application No. PCT/US2011/025206 issued by the Korean Intellectual Property Office on Oct. 17, 2011.

International Search Report for International Application No. PCT/US2012/022356 issued by the Korean Intellectual Property Office on Sep. 3, 2012.

International Search Report for International Application No. PCT/US2012/028224 issued by the Korean Intellectual Property Office on Sep. 24, 2012.

International Search Report for International Application No. PCT/US2012/051338 issued by the Korean Intellectual Property Office on Mar. 14, 2013.

International Search Report for International Application No. PCT/US2011/024465 issued Oct. 27, 2011.

1st Office Action dated May 31, 2013 issued by the State Intellectual Property Office (SIPO) of the People's Republic of China for Chinese Patent Application No. 20180047796.6.

* cited by examiner

OPTICAL DETECTION SYSTEMS AND METHODS OF USING THE SAME

RELATED APPLICATIONS

This application claims the benefit of priority to U.S. Provisional Patent Application Ser. No. 61/338,466, filed on Feb. 18, 2010, and to U.S. Provisional Patent Application Ser. No. 61/367,515, filed on Jul. 26, 2010, the contents of both of which are incorporated in this application by reference.

TECHNICAL FIELD

This invention relates generally to the field of optical detection systems and, more particularly, to improved systems and methods for accurately detecting presence in, and/or interference with, an area to be monitored using fiber optics.

BACKGROUND OF THE INVENTION

Fiber optic sensing systems have been used in a number of applications including perimeter security, acoustic sensing, and leak detection. Examples of conventional fiber optic sensing systems include (1) modal interference-based systems; (2) time-correlated Mach-Zehnder interferometer-based systems; and (3) coherent Rayleigh backscattering-based systems. Each of these conventional systems suffers from certain deficiencies.

For example, modal interference-based systems provide very limited information about an event such as the location and/or time of an event. Further, such systems have difficulty distinguishing between multiple simultaneous events. Time-correlated Mach-Zehnder-based systems have difficulty discerning continuous events (e.g., a pipe leak). Coherent Rayleigh backscattering-based systems suffer from high interrogator costs and limited sensitivity. Further, certain of these conventional systems utilize photonics boxes located throughout an array that require electrical power to be provided locally, rendering such systems impractical for long distance applications such as border security.

Thus, a need exists for, and it would be desirable to provide, improved optical detection systems.

BRIEF SUMMARY OF THE INVENTION

To meet this and other needs, and in view of its purposes, the present invention provides, according to an exemplary embodiment, an optical detection system. The optical detection system includes a host node including (a) an optical source for generating optical signals, and (b) an optical receiver. The optical detection system also includes a plurality of fiber optic sensors for converting vibrational energy to optical intensity information, each of the fiber optic sensors including: (1) at least one length of optical fiber configured to sense vibrational energy; (2) a reflector at an end of the at least one length of optical fiber; and (3) a field node for receiving optical signals from the host node, the field node transmitting optical signals along the at least one length of optical fiber, the field node receiving optical signals back from the at least one length of optical fiber, and the field node transmitting optical signals to the optical receiver of the host node.

According to another exemplary embodiment of the present invention, a method of operating an optical detection system is provided. The method includes the steps of: (a) storing a plurality of predetermined characteristics of events to be monitored using the optical detection system in memory; (b) comparing a detected characteristic obtained from the optical detection system to the plurality of predetermined characteristics stored in memory; and (c) determining if there is an acceptable level of matching between the detected characteristic and at least one of the plurality of predetermined characteristics stored in memory.

It is to be understood that both the foregoing general description and the following detailed description are exemplary, but are not restrictive, of the invention.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawing are the following figures.

DETAILED DESCRIPTION OF THE INVENTION

In order to enable detection and classification of events in connection with a system or location to be monitored (e.g., a pipeline, a mine, a fence line, an open area, a body of water, a perimeter, etc.), it is desirable to have a high fidelity electronic representation of a disturbance (e.g., mechanical vibration, acoustic vibration, impact, intrusion, etc.). According to certain exemplary embodiments of the present invention, an optical detection system is provided which utilizes interferometers with high linearity and dynamic range (e.g., certain linearized Sagnac interferometers). The optical detection systems may also include a low noise, low distortion, optical receiver.

In certain more specific exemplary embodiments of the present invention, optical detection systems utilizing an integrated sensor array (e.g., including a sensing cable divided into sensing zones which may be arranged to include a series of linearized Sagnac interferometers) for monitoring systems/locations are provided. Such optical detection systems may include a host node including an interrogation sub-system and a signal processor.

Figure 1A:
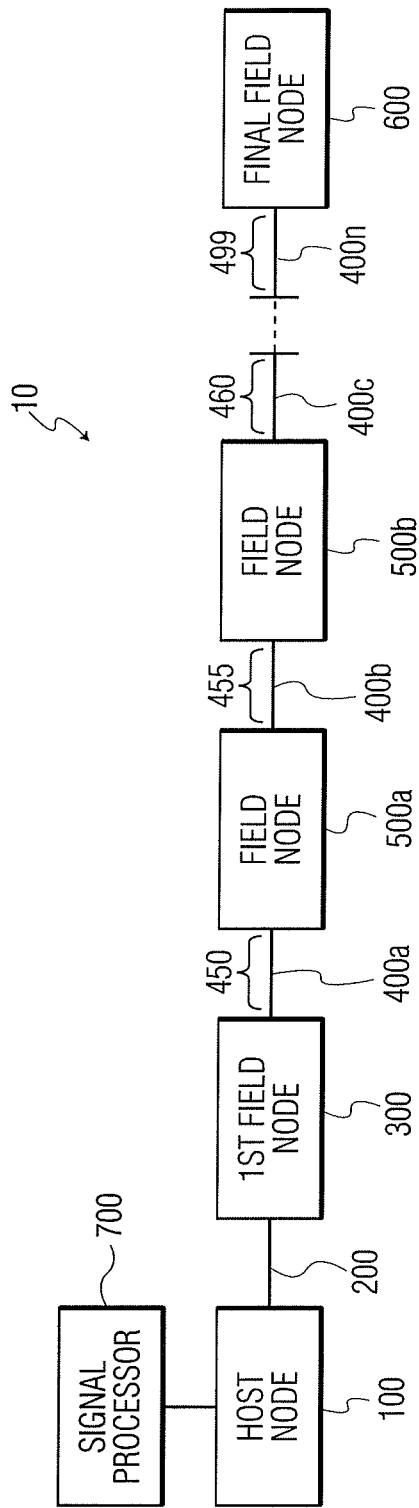
FIG. 1A is a block diagram illustrating an optical detection system in accordance with an exemplary embodiment of the present invention.

Referring now to the drawings, in which like reference numbers refer to like elements throughout the various figures that comprise the drawings, FIG. 1A illustrates an optical detection system 10. Optical detection system 10 includes a plurality of fiber optic cables (i.e., optical sensing cables) 400a, 400b, 400c . . . , 400n (which may be termed transducers) configured into separate sensing zones 450, 455, 460 . . . , 499. Optical detection system 10 also includes a plurality of field nodes including a first field node 300; intermediate field nodes 500a, 500b, etc.; and a final field node 600. Optical detection system 10 also includes a lead cable 200 (e.g., a lead cable for telemetry of probe and return signals from each of the zones, a length of such lead cable being application dependent, with an exemplary lead cable being on the order of meters to kilometers in length), a host node 100, and a signal processor 700. In the example shown in FIG. 1A, the optical detection system 10 includes a single host node 100, and a single first field node 300. Depending on the exact configuration of the optical detection system 10 (e.g., the number of sensing zones, the length of the cables covering each of the sensing zones, etc.), there may be a plurality of host nodes, first field nodes, etc., as is desired in the given application.

An exemplary operation of the configuration illustrated in FIG. 1A may be summarized as follows. Host node 100 (which works in conjunction with signal processor 700) generates optical signals and transmits the signals along lead cable 200 to first field node 300 (e.g., where the elements and configuration of the optical detection system, including lead cable 200, may be selected to minimize the lead cable sensitivity to vibration). As will be detailed below, part of the optical signals from host node 100 (intended for use in monitoring sensing zone 450) are transmitted through first field node 300 and along optical sensing cable 400a, are reflected back after reaching intermediate field node 500a, where the reflected signals return along optical sensing cable 400a and ultimately return to host node 100 and signal processor 700 for processing. Another part of the optical signals from host node 100 (intended for use in monitoring sensing zone 455) is transmitted through first field node 300, along optical sensing cable 400a, through intermediate field node 500a, along optical sensing cable 400b, and is reflected back after reaching intermediate field node 500b, where the reflected signals return along optical sensing cables 400b, 400a, and the signals ultimately return to host node 100 and signal processor 700 for processing. A similar process occurs for each subsequent sensing zone. As is clear in FIG. 1A, any number of desired subsequent sensing zones are contemplated (as indicated by the dotted line between zones 460 and 499), with the final sensing zone 499 terminating with final field node 600.

FIGS. 1B-1F illustrate optical detection system 10 used in a variety of sensing applications. In each of FIGS. 1B-1F, host node 100 and signal processor 700 are housed in a control room (i.e., control room 150, 160, 170, 180, 190) or other desirable environment (e.g., a remote, stable environment). The fiber optic lead cable 200 runs from host node 100 to first field node 300.

Figure 1B:
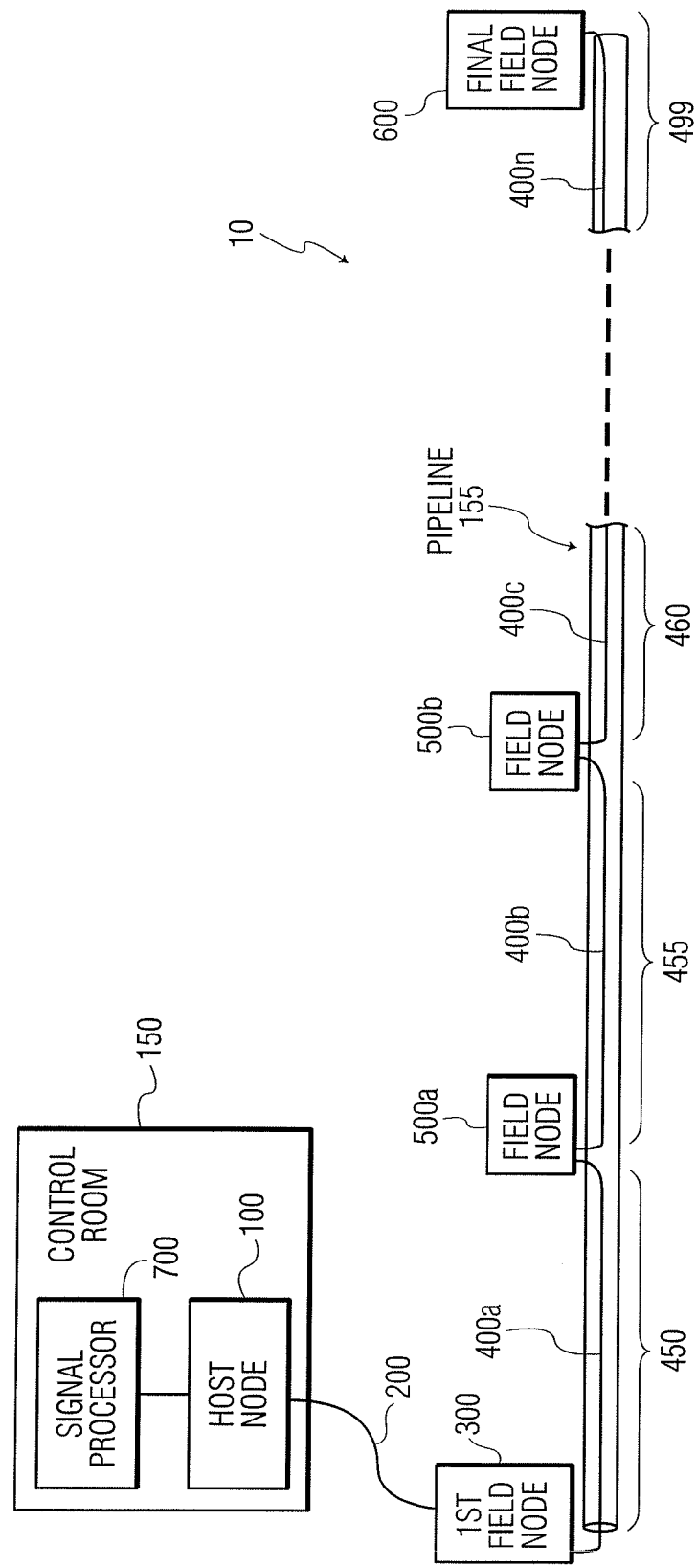
FIG. 1B is a block diagram illustrating the optical detection system of FIG. 1A used in connection with a pipeline in accordance with an exemplary embodiment of the present invention.
Figure 1C:
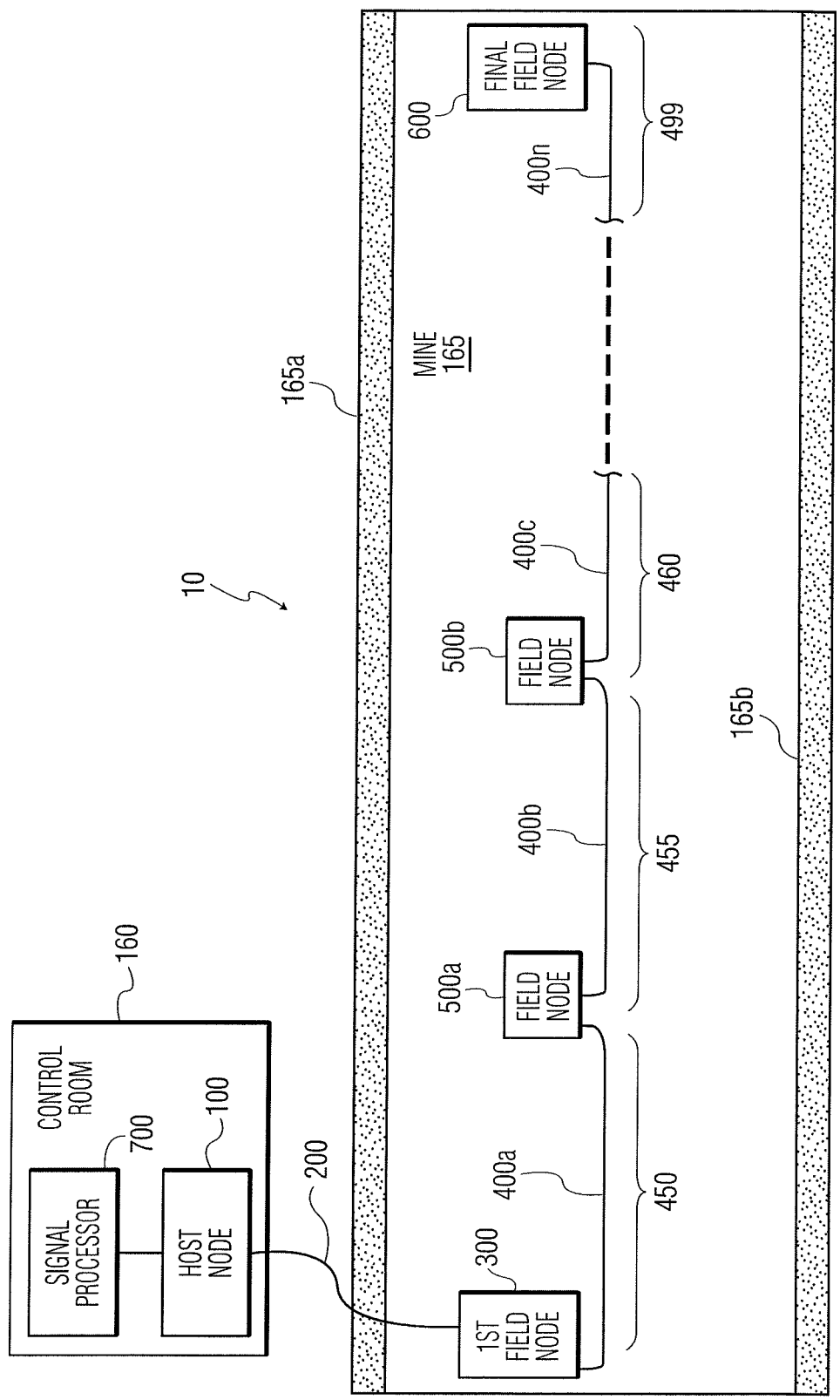
FIG. 1C is a block diagram illustrating the optical detection system of FIG. 1A used in connection with a mine in accordance with an exemplary embodiment of the present invention.
Figure 1D:
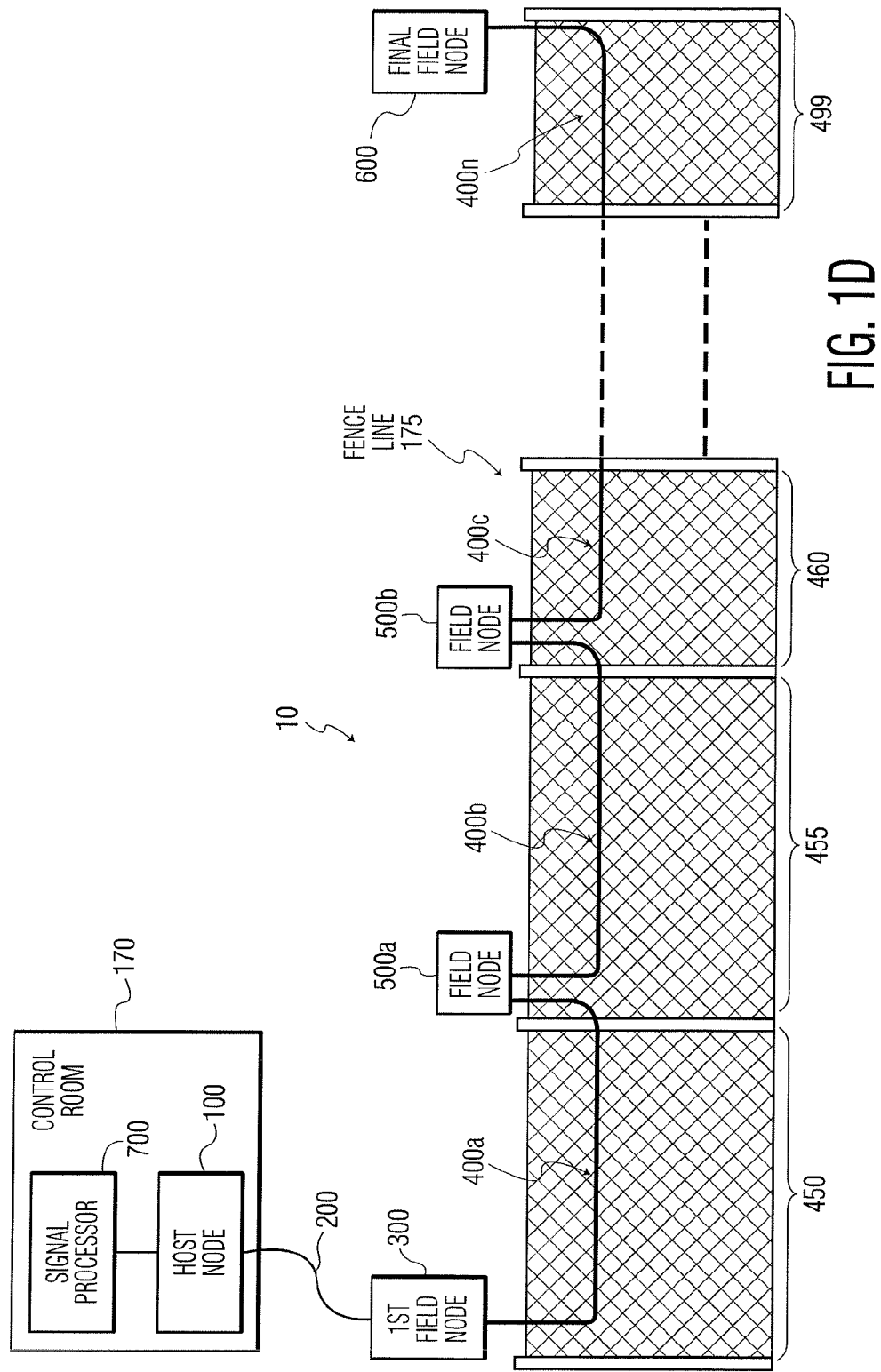
FIG. 1D is a block diagram illustrating the optical detection system of FIG. 1A used in connection with a fence line in accordance with an exemplary embodiment of the present invention.
Figure 1E:
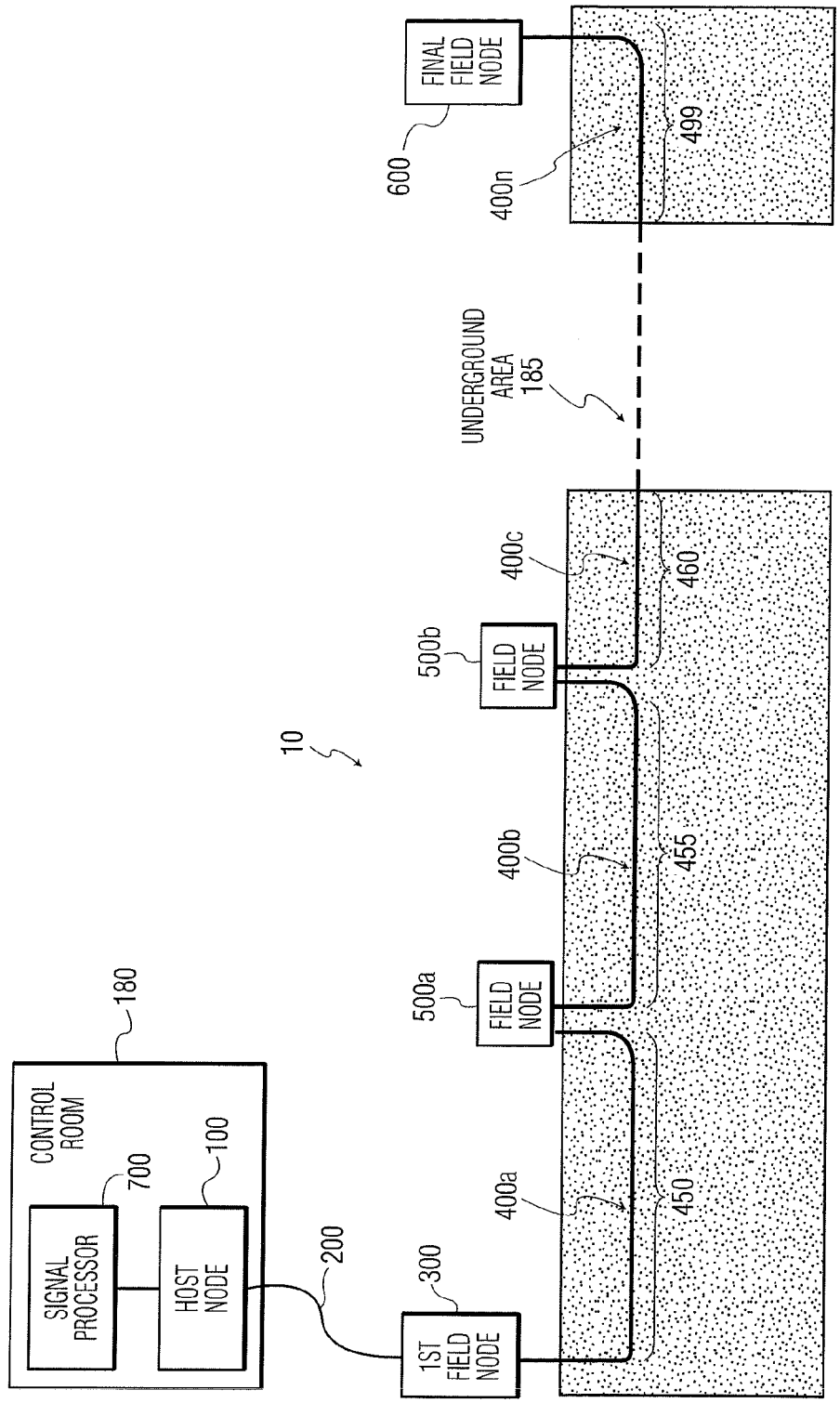
FIG. 1E is a block diagram illustrating the optical detection system of FIG. 1A used in connection with underground monitoring in accordance with an exemplary embodiment of the present invention.
Figure 1F:
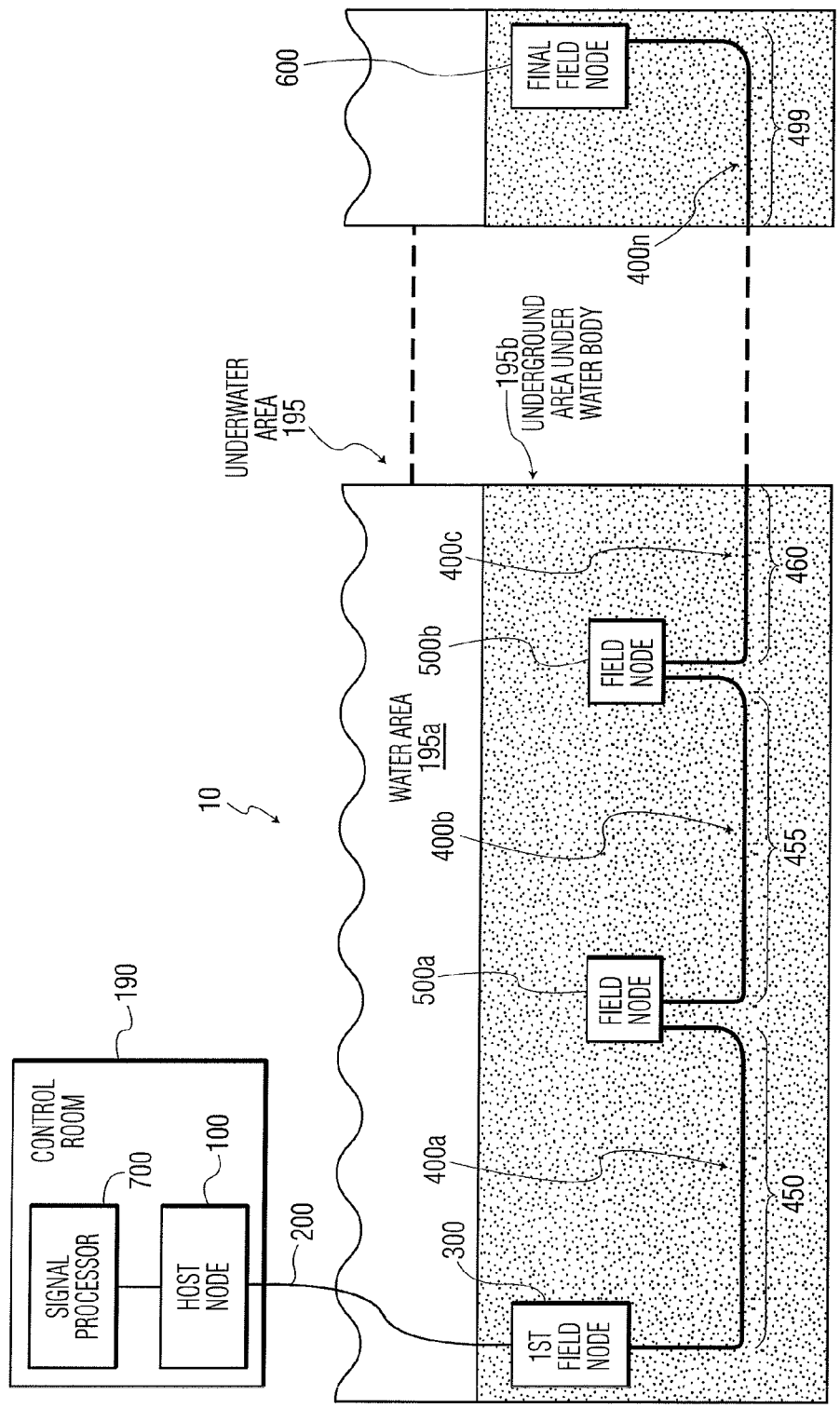
FIG. 1F is a block diagram illustrating the optical detection system of FIG. 1A used in connection with underwater monitoring in accordance with an exemplary embodiment of the present invention.

FIG. 1B illustrates optical detection system 10 used to sense disturbances (e.g., leaks, tampering events, etc.) along a pipeline 155, where each sensing zone 450, 455, 460 . . . 499 corresponds to a given length of pipeline 155. FIG. 1C illustrates optical detection system 10 used to sense disturbances (e.g., presence of miners, voices, etc.) within a mine 165 (below the ground level 165a and above the mine floor 165b), where each sensing zone 450, 455, 460 . . . 499 corresponds to a given area of mine 165. FIG. 1D illustrates optical detection system 10 used to sense disturbances (e.g., climbing, cutting, etc.) along a fence line 175, where each sensing zone 450, 455, 460 . . . 499 corresponds to a given length of fence line 175. FIG. 1E illustrates optical detection system 10 used to sense disturbances (e.g., walking, digging, tunneling, etc.) along an underground area 185 (e.g., a border area, a perimeter area, etc. that is desired to be monitored), where each sensing zone 450, 455, 460 . . . 499 corresponds to a given length of underground area 185. FIG. 1F illustrates optical detection system 10 used to sense disturbances (e.g., boats operating or divers breathing) along an underwater area 195 (e.g., where the fiber cables may be buried in the area 195b beneath the ground beneath the water as illustrated in FIG. 1F, or under the water area 195a but above underground area 195b), where each sensing zone 450, 455, 460 . . . 499 corresponds to a given length of underwater area 195.

Optical detection system 10 in FIGS. 1A-1F may solely utilize lengths of optical sensing cable 400a, 400b, etc. to sense disturbances; however, the present invention is not limited to that embodiment. For example, one or more point sensing transducers 50 may be integrated into each of the sensing zones. Such point sensing transducers 50 may be used to sense a disturbance at a specific "point" along a sensing cable segment as opposed to general sensing anywhere along the sensing cable segment. Further, such point sensing transducers may include elements or structure distinct from (and in addition to) the sensing cable segment.

Figure 1G:
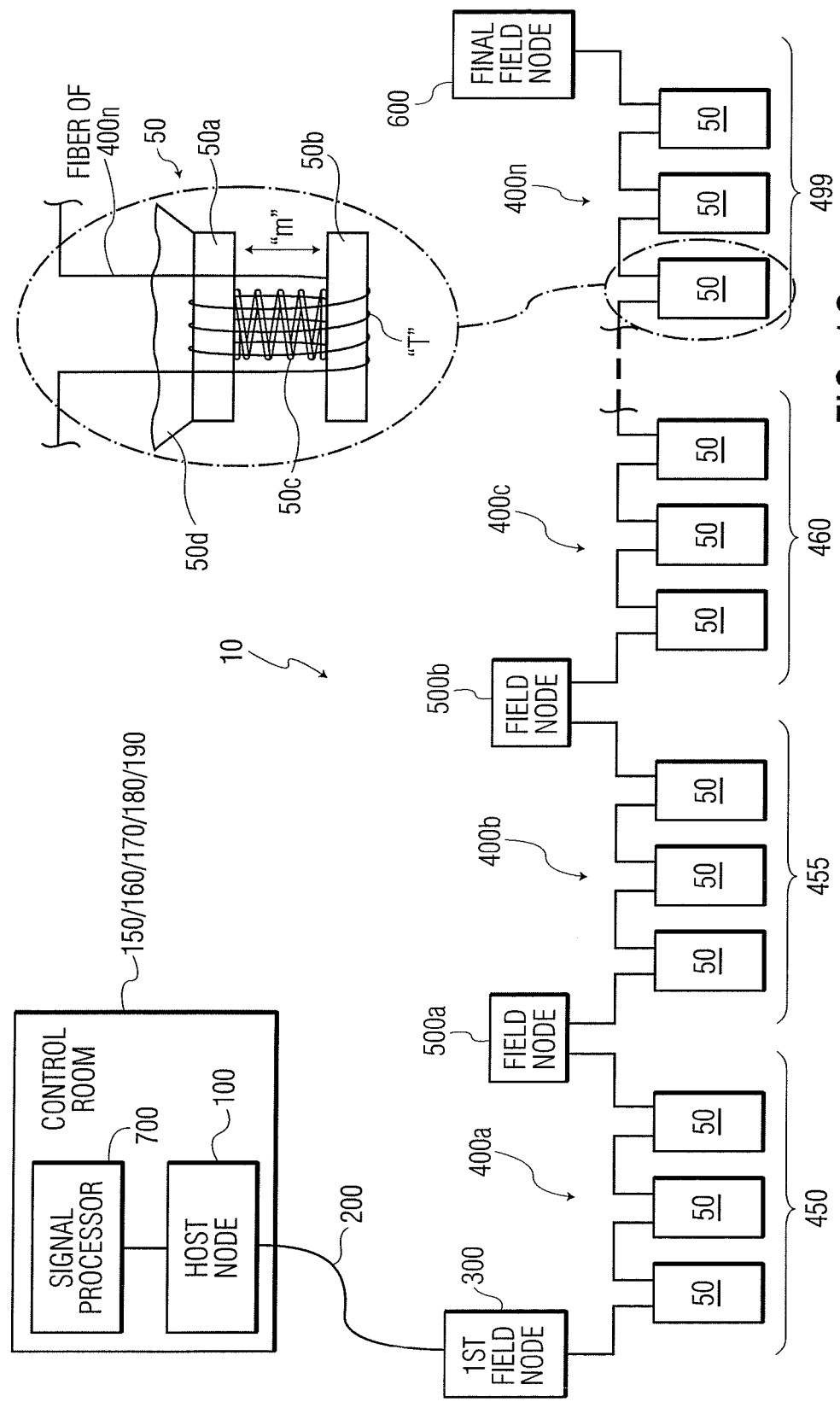
FIG. 1G is a block diagram illustrating the optical detection system of FIG. 1A utilizing point sensing transducers along each sensing zone in accordance with an exemplary embodiment of the present invention.

In a specific example, FIG. 1G (where like reference numerals correspond to like elements from FIGS. 1A-1F) illustrates three acceleration transducers 50 (e.g., part of an accelerometer) engaged with each optical sensing cable 400a, 400b, etc. A detailed view is provided of an exemplary acceleration transducer 50 that includes a fixed member 50a configured to be secured to a body of interest 50d and a movable member 50b. Transducer 50 includes a spring member 50c between movable member 50b and fixed member 50a. A portion of optical fiber (e.g., part of optical sensing cable 400a) is wrapped for one or more turns "T" around fixed member 50a and movable member 50b (e.g., where the turns "T" of the optical fiber span the spring member 50c). Thus, when a disturbance occurs the movable member 50b moves (e.g., along at least one range of motion such as motion axis "m") with respect to fixed member 50a, where such movement causes a change in strain to the optical fiber of the optical sensing cable. As will be appreciated by those skilled in the art, use of one or more transducers 50 may provide improved sensing of disturbances. Such point sensing transducers 50 may be used in connection with any configuration of the present invention including but not limited to the embodiments shown and described in FIGS. 1A-1F.

Figure 2:
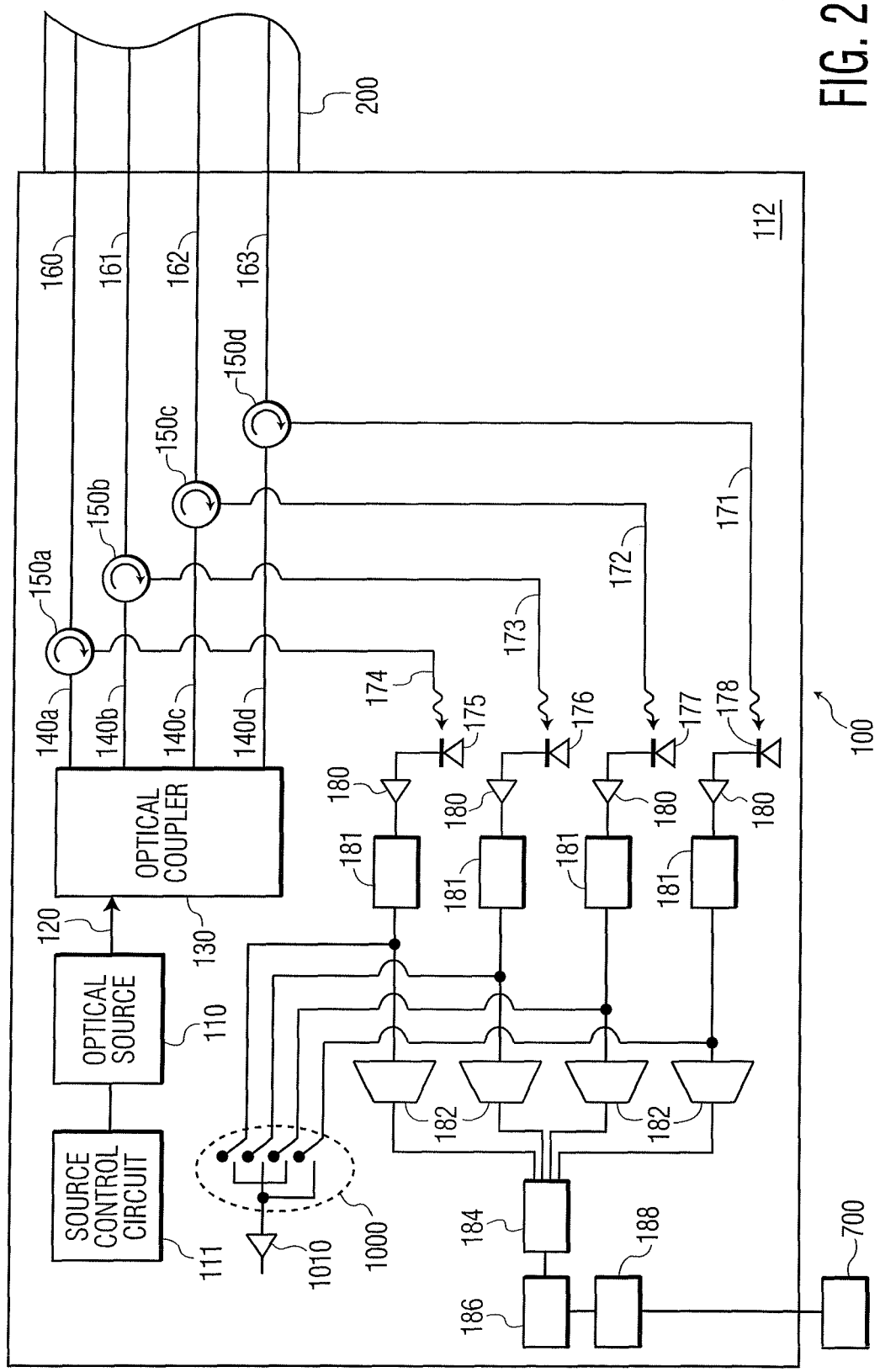
FIG. 2 is a block diagram of a host node of an optical detection system in accordance with an exemplary embodiment of the present invention.

Details of the elements of an exemplary optical detection system 10 (in any of FIGS. 1A-1G) is now described. Referring to FIG. 2, host node 100 includes one or more optical sources 110 (e.g., LED sources such as superluminescent light emitting diodes, edge emitting light emitting diodes, other light emitting diode sources, lasers, etc.) within an enclosure 112. According to an exemplary embodiment of the present invention, optical source 110 may be a broadband optical source operated in a continuous wave (CW) mode. Optical source 110 is controlled by a source control circuit 111. In the exemplary embodiment now described (described and illustrated in connection with four sensing zones), optical source 110 is connected via an optical cable 120 to a 1×4 splitter (such as a 1×4 or 4×4 fiber optic coupler or an integrated optic splitter) labeled as optical coupler 130. Optical coupler 130 divides the light intensity output from optical source 110 into four signals along respective fibers 140a, 140b, 140c, and 140d (e.g., four substantially equal intensity signals) that are each output to a respective input lead of a corresponding optical circulator 150a, 150b, 150c, and 150d (e.g., identical optical circulators 150a, 150b, 150c, and 150d). Output signals are provided along each of fibers 160, 161, 162, 163 within fiber optic lead cable 200 from a respective one of optical circulators 150a, 150b, 150c, and 150d.

As provided above, according to certain exemplary embodiments of the present invention, linearized Sagnac interferometers are utilized. As will be appreciated by one skilled in the art, in order to provide a linearized Sagnac interferometer, the architecture of a traditional loop configuration Sagnac interferometer (e.g., typically used to sense rotation) is modified (e.g., folded) to allow measurements of phase perturbations along an optical fiber in a non-looped configuration, for example, by incorporation of a 1×2 fiber optic coupler. Referring again to FIG. 2 (and FIG. 3), light output from host node 100 travels along each of fibers 160, 161, 162, and 163 within lead cable 200 which is connected to first field node 300. First field node 300 includes an enclosure 310 which houses a series of components.

Figure 3:
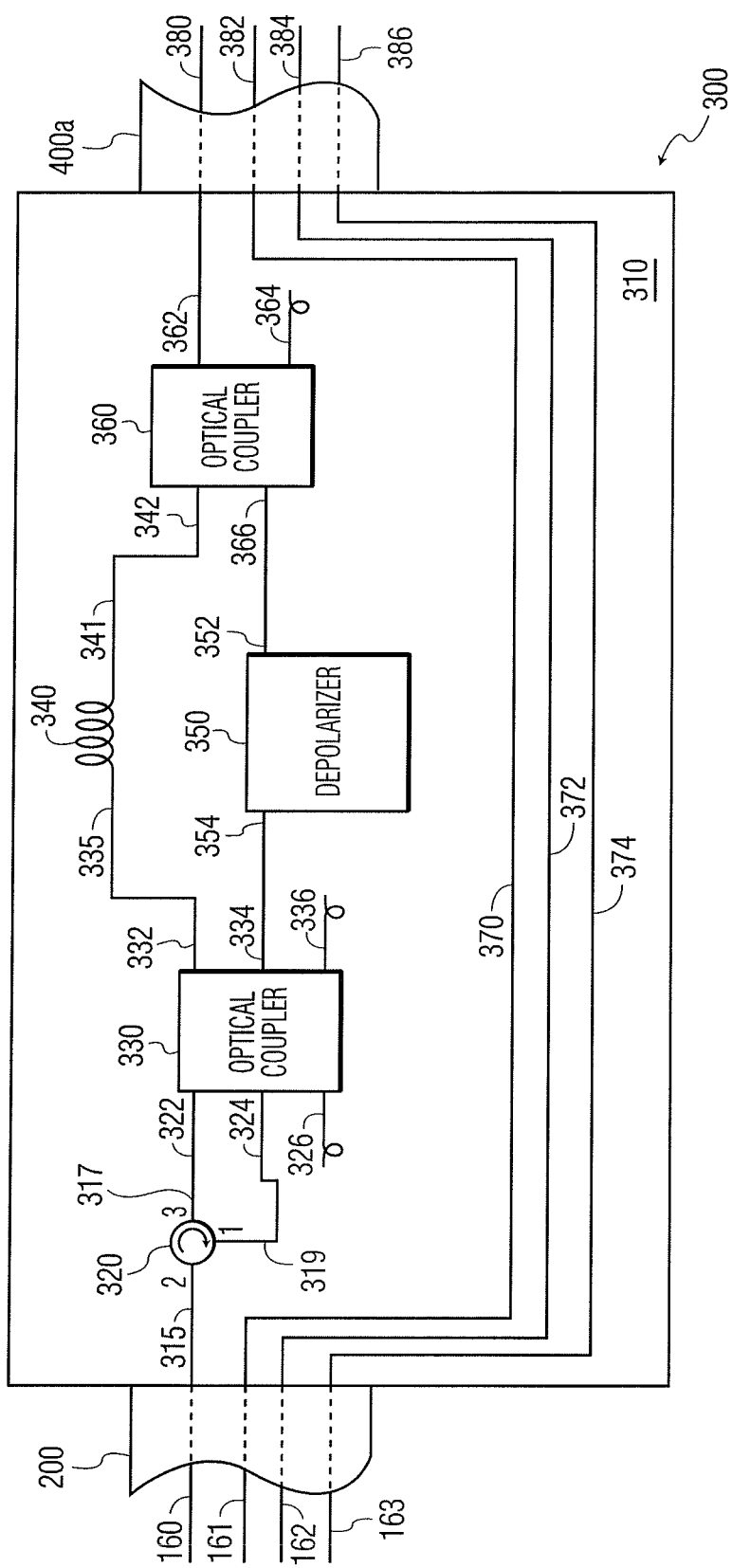
FIG. 3 is a block diagram of a first field node of an optical detection system in accordance with an exemplary embodiment of the present invention.

In FIG. 3, fiber 160 is connected to an input/output lead 315 of an optical circulator 320. A lead 317 of optical circulator 320 is connected to a lead 322 of an optical coupler 330 (e.g., a 3×3 fiber optic coupler 330). A lead 319 of optical circulator 320 is connected to a lead 324 of optical coupler 330.

A lead 332 of optical coupler 330 is connected to a lead 335 of a delay coil 340. The fiber optic delay coil 340 has a length of, for example, at least twice the length of the zone 450 of an optical fiber 380 in optical sensing cable 400a where the midpoint of the sensing loop (e.g., from one output leg of the 3×3 coupler to another) including the sensing optical fiber 380 "unfolded" is within the enclosure 310 for maximum sensitivity. A lead 341 of delay coil 340 is connected to a lead 342 of an optical coupler 360 (e.g., a 2×2 fiber optical coupler 360).

A lead 334 of optical coupler 330 is connected to a lead 354 of a depolarizer 350. A lead 326 of optical coupler 330 is tied off and/or the end crushed to minimize light that is reflected back into optical coupler 330. Similarly, a lead 336 of optical coupler 330 is tied off and/or the end crushed to minimize light that is reflected back into optical coupler 330.

Depolarizer 350 significantly reduces polarization-induced signal fading, allowing inexpensive single mode fiber to be used for all of the optical components and cable fibers rather than costly polarization-maintaining fiber. Depolarizer 350 may be one of several commercially available depolarizers, such as, for example, a recirculating coupler (single or multiple stage) or a Lyot Depolarizer. A lead 352 of depolarizer 350 is connected to a lead 366 of optical coupler 360. A lead 362 of optical coupler 360 is connected to fiber 380 in optical sensing cable 400a. A lead 364 of optical coupler 360 is tied off and/or the end crushed to minimize light that is reflected back into optical coupler 360. Although one example for optical coupler 360 is a 2×2 fiber optic coupler, optical coupler 360 is not limited to that embodiment. For example, a 1×2 fiber optic coupler may be used instead of a 2×2 fiber optic coupler 360, thereby obviating the tying off of second output lead 364.

Fibers 161, 162, and 163 in lead cable 200 are connected to fibers 370, 372, and 374 in field node 300, respectively. These are pass-through fibers not actively used in first field node 300, but rather to be used in connection with sensing in other nodes. Fibers 370, 372, and 374 are connected to fibers 382, 384, and 386 in optical sensing cable 400a, respectively. Fiber 380 in optical sensing cable 400a is used for sensing within zone 450. Fiber 380 in optical sensing cable 400a (which had been used for sensing in zone 450) is attached to a fiber 580 in intermediate field node 500a (see FIG. 4). Fiber 580 is connected to a reflector 581 (e.g., broadband reflector 581). Disturbances along sensing cable 400a cause small changes in the length of fiber 380. These changes cause non-reciprocal changes in the phase of the light travelling through the Sagnac interferometer.

An exemplary operation of first field node 300 shown in FIG. 3 (and partially in FIG. 4) is now provided. An optical signal (i.e., light from host node 200 entering first field node 300) propagates along fiber 160 to lead 315 and enters port 2 of optical circulator 320, and then exits port 3 of optical circulator 320 through lead 317, and then propagates along lead 322 (a length of optical fiber) to optical coupler 330. Optical coupler 330 divides the light into optical signals along two counterpropagating paths: a first path of the divided light extends from lead 332 to delay coil 340 along lead 335, and then from lead 341 to optical coupler 360 through lead 342; a second path of the divided light extends from lead 334 to depolarizer 350 through lead 354, and then from lead 352 to optical coupler 360 through lead 366. Thus, the light along the first path is delayed with respect to the light along the second path by a time approximately proportional to the length of delay coil 340. The two counterpropagating optical signals recombine at optical coupler 360, and the recombined optical signal exits optical coupler 360 along lead 362, and then travels along fiber 380 (for sensing within zone 450) of optical sensing cable 400a. The recombined optical signal enters field node 500a on fiber 380, and propagates along lead 580 to reflector 581, and is then reflected back along fiber 380 to first field node 300. This reflected signal is divided into two optical signals by optical coupler 360, where each of the optical signals travels along a counterpropagating path and recombines coherently at optical coupler 330. The result of the optical signals recombining at optical coupler 330 is that the recombined light has an intensity output proportional to the phase perturbation from the original disturbance along fiber 380 within optical sensing cable 400a. This optical signal (having a variable intensity) is output from optical coupler 330 along lead 324 (i.e., fiber 324) and then along lead 319 into port 1 of optical circulator 320. This optical signal propagates from port 1 to port 2 of optical circulator 320, and then along lead 315 to fiber 160 of lead cable 200. The signal is transmitted along fiber 160 of lead cable 200 to the interrogator of host node 100.

Figure 4:
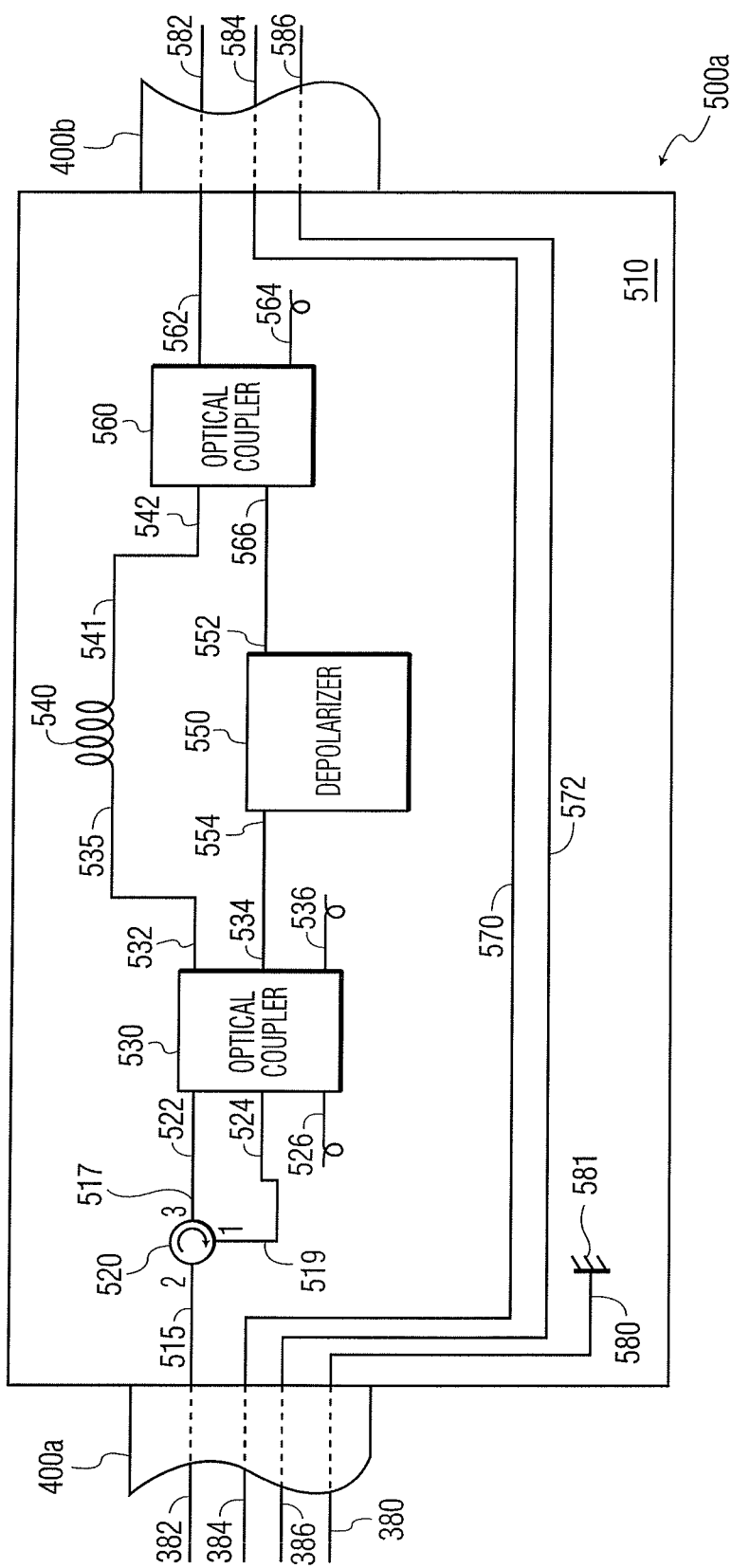
FIG. 4 is a block diagram of an intermediate field node of an optical detection system in accordance with an exemplary embodiment of the present invention.

Referring now to FIG. 4, fibers 384 and 386 in optical sensing cable 400a are connected to fibers 570, 572 in intermediate field node 500a, respectively. These are pass-through fibers not actively used in intermediate field node 500a, but rather to be used in connection with sensing in other nodes.

Fibers 570, 572 are connected to fibers 584, 586 in optical sensing cable 400b, respectively. Fiber 582 in optical sensing cable 400b is used for sensing within zone 455.

Fiber 382 from optical sensing cable 400a is connected to an input/output lead 515 of an optical circulator 520. The lead 517 of optical circulator 520 is connected to a lead 522 of an optical coupler 530 (e.g., a 3×3 fiber optic coupler 530). A lead 519 of optical circulator 520 is connected to a lead 524 of optical coupler 530.

A lead 532 of optical coupler 530 is connected to lead 535 of a delay coil 540. The fiber optic delay coil 540 has a length of, for example, at least twice the length of the zone 455 of optical fiber 582 in fiber optic sensing cable 400b where the midpoint of the sensing loop (e.g., from one output leg of the 3×3 coupler to another), including the sensing optical fiber 582 "unfolded" is within the enclosure 510 for maximum sensitivity. A lead 541 of delay coil 540 is connected to a lead 542 of an optical coupler 560 (e.g., a 2×2 fiber optic coupler 560).

A lead 534 of optical coupler 530 is connected to a lead 554 of a depolarizer 550. A lead 526 of optical coupler 530 is tied off and/or the end crushed to minimize light that is reflected back into optical coupler 530. Similarly, a lead 536 of optical coupler 530 is tied off and/or the end crushed to minimize light that is reflected back into optical coupler 530. A lead 552 of depolarizer 550 is connected to a lead 566 of optical coupler 560. A lead 562 of optical coupler 560 is connected to fiber 582 in optical sensing cable 400b. A lead 564 of optical coupler 560 is tied off and/or the end crushed to minimize light that is reflected back into optical coupler 560. Although an exemplary optical coupler 560 is a 2×2 fiber optic coupler, the optical coupler 560 is not limited to that embodiment. For example, a 1×2 fiber optic coupler may be used instead of a 2×2 fiber optic coupler 560, thereby obviating the tying off of lead 564.

An exemplary operation of field node 500a shown in FIG. 4 is now provided. An optical signal (i.e., light from host node 200 entering field node 500a) propagates along fiber 382 to lead 515 and enters port 2 of optical circulator 520, and then exits port 3 of optical circulator 520 through lead 517, and then propagates along lead 522 (a length of optical fiber) to optical coupler 530. Optical coupler 530 divides the light into optical signals along two counterpropagating paths: a first path of the divided light extends from lead 532 to delay coil 540 along lead 535, and then from lead 541 to optical coupler 560 through lead 542; a second path of the divided light extends from lead 534 to depolarizer 550 through lead 554, and then from lead 552 to optical coupler 560 through lead 566. Thus, the light along the first path is delayed with respect to the light along the second path by a time approximately proportional to the length of delay coil 540. The two counterpropagating optical signals recombine at optical coupler 560, and the recombined optical signal exits optical coupler 560 along lead 562, and then travels along fiber 582 (for sensing within zone 455) of optical sensing cable 400b. The recombined optical signal enters field node 500b (see FIGS. 1A-1G) on fiber 582, and is reflected back (using a reflector in field node 500b similar to reflector 581 in field node 500a) along fiber 582 to field node 500a. This reflected signal is divided into two optical signals by optical coupler 560, where each of the optical signals travels along a counterpropagating path and recombines coherently at optical coupler 530. The result of the optical signals recombining at optical coupler 530 is that the recombined light has an intensity output proportional to the phase perturbation from the original disturbance along fiber 582 within optical sensing cable 400b. This optical signal (having a variable intensity) is output from optical coupler 530 along lead 524 (i.e., fiber 524) and then along lead 519 into port 1 of optical circulator 520. This optical signal propagates from port 1 to port 2 of optical circulator 520, and then along lead 515 to fiber 382/pass through fiber 370 to fiber 161 of lead cable 200. The signal is transmitted along fiber 161 of lead cable 200 to the interrogator of host node 100.

Figure 5:
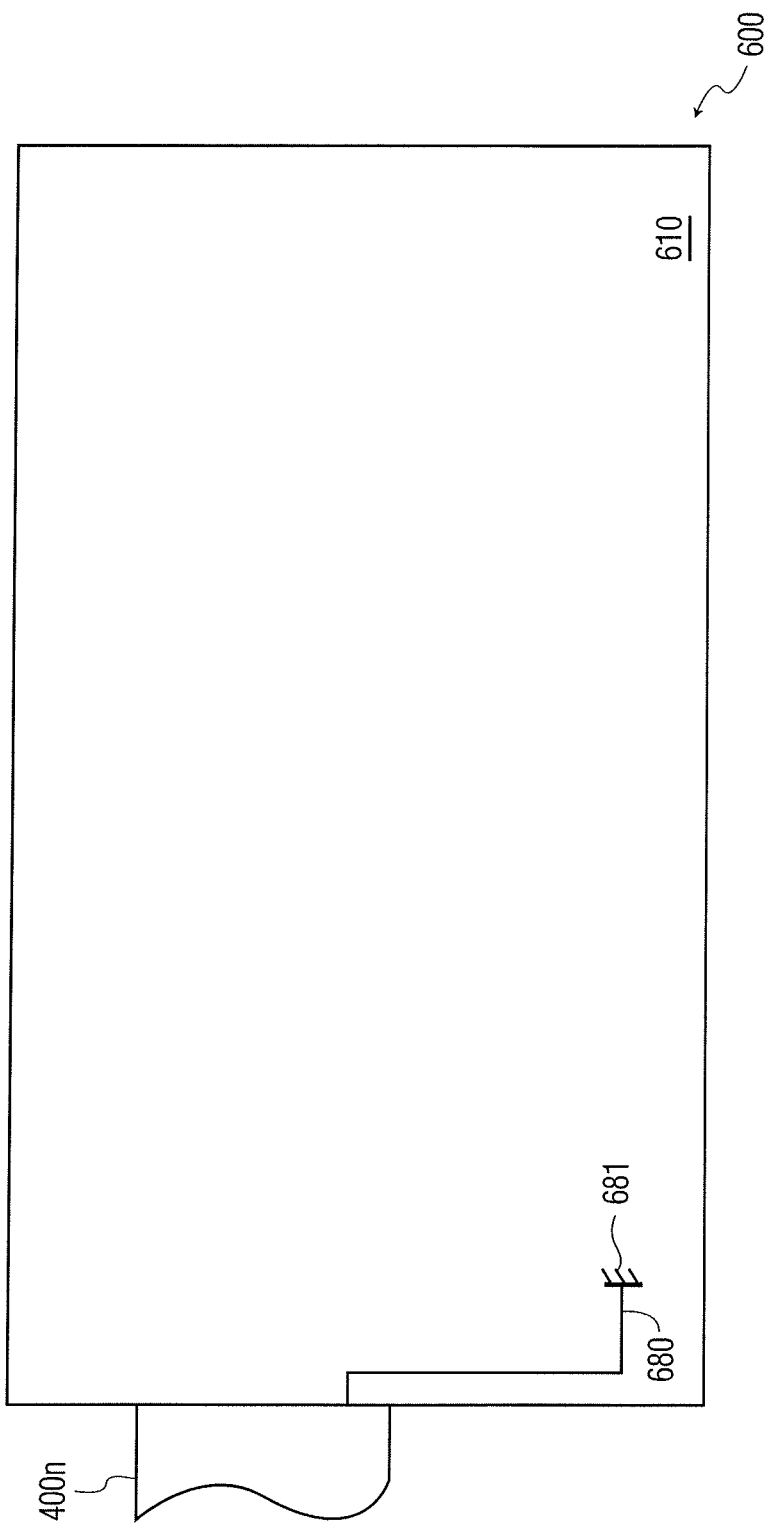
FIG. 5 is a block diagram of a final field node of an optical detection system in accordance with an exemplary embodiment of the present invention.

The pattern of field nodes 500a, 500b, etc. and optical sensing cables 400a, 400b, etc. is repeated, as desired, and utilizing the number of available optical fibers within the cable. Other system level topologies (e.g., branching, bi-directional/redundancy, etc.) are contemplated using this modular approach. Each optical sensing cable 400a, 400b, etc. may be used to provide an acoustically independent sensing zone. FIG. 5 illustrates final field node 600 including an enclosure 610 for receiving final optical sensing cable 400n. Optical sensing cable 400n includes a fiber 680 which is connected to a reflector 681 (e.g., broadband reflector 681).

Referring back to FIG. 2, optical intensity signals proportional to the phase perturbations within each zone (e.g., due to mechanical or acoustic vibrations sensed) are returned to host node 100 (which may be considered an interrogator) by way of fibers 160, 161, 162, and 163 and then through circulators 150a, 150b, 150c, and 150d after conversion from a phase signal to an intensity signal at coupler 330 or 530, etc. Circulators 150a, 150b, 150c, and 150d are configured to behave in such as way as to allow signals from fiber 160 to pass through to a fiber 174, for signals from fiber 161 to pass through to a fiber 173, for signals from fiber 162 to pass through to a fiber 172, and for signals from fiber 163 to pass through to a fiber 171. However, the circulators 150 prevent light from passing from: fiber 160 or fiber 174 to fiber 140a; fiber 161 or fiber 173 to fiber 140b; fiber 162 or fiber 172 to fiber 140c; and fiber 163 or fiber 171 to fiber 140d, etc. Light from fiber 174 is converted to an electrical current signal at a photodetector 175. Likewise, light from fiber 173 is converted to an electrical current signal at a photodetector 176, light from fiber 172 is converted to an electrical current signal at a photodetector 177, and light from fiber 171 is converted to an electrical signal at a photodetector 178. The electrical signals converted by photodetectors 175, 176, 177, and 178 may be very low noise signals, with dark current less than about 0.5 nA.

The outputs of photodetectors 175, 176, 177, and 178 are then amplified using transimpedance amplifiers 180 (e.g., amplifiers of very low distortion (less than −90 dB), high gain bandwidth (on the order of 500-2,000 MHz), and noise less than 1 nV/√Hz (such as the model AD8099, produced by Analog Devices, Inc.)). Multiple stages of further amplification may follow each transimpedance amplifier 180 as is known by those skilled in the state of the art. The electrical outputs of amplifiers 180 are filtered using filters 181. Use of high quality photodetectors, amplifiers, and filters desirably produces signals with fidelity sufficient for advanced signal processing desired for robust classification of detected events and alarm generation (or other indications based on mechanical/acoustic vibration) without false alarms. The signals output from filters 181 are sampled by A/D converters (ADCs) 182. The sampled electrical signals from ADCs 182 are received by one or more Field Programmable Gate Arrays (FPGAs) 184.

FPGAs 184 may be configured to perform high speed signal pre-processing. Such FPGAs 184 are typically used to perform filtering and Fast Fourier Transforms (FFTs) of the sampled data from each zone to determine the instantaneous spectrum of the disturbance(s) along each zone. Further processing is performed by a microprocessor 186 as shown in FIG. 2. Communication with outside security system processors and other peripheral devices is accomplished with an interface chip 188. Interface chip 188 may be for example, an RS-232 interface chip or a USB transceiver.

An exemplary signal processing sequence is accomplished as follows. From each sensing zone (e.g., zone 450, zone 455, zone 460, etc.), ADCs 182 digitize a set of data samples (e.g., at an exemplary rate of 8192 samples per second). In such an example, FPGA 184 performs a 8192 sample FFT to produce spectra, which are output to the microprocessor 186. Microprocessor 186 groups the spectra output from FPGA 184 into data windows (e.g., on the order of 0.25 seconds).

In such an example, a series of spectral masks are created by processing signals generated during the introduction of known events (where such events may be configured depending upon the application). In a pipeline detection application such an event may be a hostile/alarm event such as drilling of a portion of the pipeline, cutting of a portion of the pipeline, fluid leakage from a portion of the pipeline, etc. Spectra generated by FPGA 184 during these events are saved, for example, in a database, a look-up table, or other data storage techniques. Each of these spectral masks is further modified to create a dynamic signal threshold. The spectrum of the received data within each data window is compared to the signal thresholds. A persistence requirement is established that requires "m" spectra to exceed a spectral mask for every "n" contiguous time windows which, when true, is reported as an alarm condition. The use of persistence helps minimize false alarms due to instantaneous (non-alarm) events of high energy.

The dynamic threshold is continually updated wherein a single value is calculated for each frequency band within a spectrum by summing the values of a common frequency band from all of the zones in an environmental zone (where the environmental zone is a set of real sensing zones artificially grouped by the user). These values are integrated over a user-defined time span. This dynamic threshold is used to compensate for non-instantaneous environmental effects impacting multiple zones (e.g., lasting on the order of seconds to hours), such as rain, hail, highway traffic, trains, etc. The shorter this time span of the dynamic threshold integration, the more rapidly the dynamic threshold changes. The longer this time span, the more the dynamic threshold response is damped. In addition, the amount that any one instantaneous spectra can bias the dynamic threshold can also be limited to prevent single events (such as an impact from a falling tree branch) from having an undue impact upon the threshold.

Electrical outputs from filters 181 in host node 100 may be combined and distinguished by use of a multiplexer, switch, or other appropriate mechanism 1000 to an amplifier or line driver 1010 to provide an audio output of any zone desired by a user. Providing an audible output enhances the functionality of the optical detection system 10 by enabling the user to hear the detected events as alarms are generated.

Figure 6:
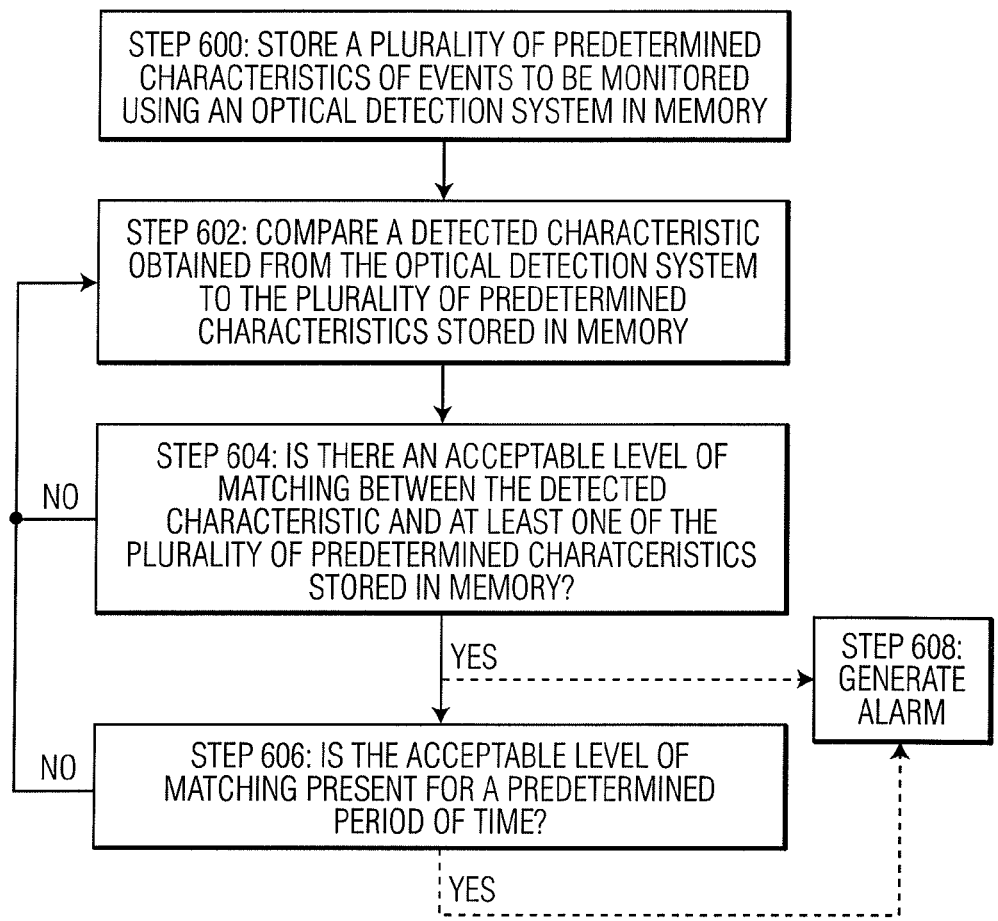
FIG. 6 is a flow diagram illustrating a method of operating an optical detection system in accordance with an exemplary embodiment of the present invention.

The present invention also includes methods of operating optical detection systems such as the optical detection systems 10 illustrated and described in connection with FIGS. 1A-1G and FIGS. 2-5. FIG. 6 illustrates an example of such a method implemented in a closed-loop fashion. At step 600, a plurality of predetermined characteristics of events to be monitored using an optical detection system are stored in memory. By "predetermined" is meant determined beforehand, so that the predetermined characteristic must be determined, i.e., chosen or at least known, in advance of some event such as implementation of the method. Depending upon the application of the optical detection system, such events (and therefore, the predetermined characteristics of such events) may vary broadly. For example, in a pipeline detection system, exemplary events may include a pipe leak, a pipe being cut by a saw, a pipe being struck by an object (e.g., a hammer), etc. Further still, the characteristics of the events may vary broadly. As provided above, such a characteristic may be spectra or a spectrum of a known event. Such a spectrum may be an energy profile over a plurality of frequencies, etc.

In one specific example, in order to provide the characteristics at step 600, a number of substeps are completed. In a first substep, a windowing function (such as a Hanning function or Beckman function) is applied to a sampled set of data points within a series of time windows during a series of known events (e.g., leaks, walking, cutting, etc.). In a second substep, a spectrum is created by applying a Fast Fourier Transform (FFT) on the windowed data. In a third substep, the spectrum is scaled in a way to include a population of system responses to a series of similar events (e.g., in such a way as to minimize false alarms) to create a spectral mask. In a fourth substep, the resultant spectral mask is associated with each event and is stored in a data structure (e.g., a database or other similarly retrievable structure).

At step 602, a detected characteristic obtained from the optical detection system (e.g., obtained from the host node by processing of optical intensity information received from the various field nodes) is compared to the plurality of predetermined characteristics stored in memory. Referring again to the spectra example described above, step 602 may include two substeps. In a first substep, windowed samples of data are acquired during normal operation, and spectra of this data are generated as a function of time. Then, in a second substep, the spectra generated during normal operation are compared to those previously associated with alarm events and stored (e.g., compared to the characteristic provided in step 600).

At step 604, a determination is made as to whether there is an acceptable level of matching between the detected characteristic from step 602 and at least one of the plurality of predetermined characteristics stored in memory in step 600. If there is no such acceptable level of matching (i.e., a "No" answer at step 604), then the process returns to step 602 and further comparisons are made with updated data. If there is such an acceptable level of matching (i.e., a "Yes" answer at step 604) then an alarm may be generated at step 608.

As will be appreciated by those skilled in the art, certain types of events may be of a momentary nature, and a momentary match (i.e., a momentary acceptable level of matching at step 604) may suffice to generate an alarm at step 608. However, other types of events may be of such a type where it is appropriate to confirm that the event continues for a predetermined period of time. In such a case, even if there is such an acceptable level of matching (i.e., a "Yes" answer at step 604) at step 602, the process may not immediately generate an alarm, but rather may proceed to step 606 where a determination is made as to whether the acceptable level of matching is present for a predetermined period of time (e.g., or apply a persistence test to the processed operational data to see if it exceeds an alarm threshold, where such threshold may be the predetermined period of time, or some other threshold). If the answer at step 606 is "Yes," then an alarm is generated at step 608. If the answer at step 606 is "No," then the process proceeds to step 602 for continued monitoring. The step 606 of determining if the acceptable level of matching is present for a predetermined period of time can be accomplished in a closed loop fashion wherein a counter is updated for each incremental time period during which there is an acceptable level of matching.

Although the present invention has been described in connection with certain exemplary applications (e.g., pipeline monitoring, mine monitoring, fence line monitoring, underground monitoring, underwater monitoring, etc.) it is not limited to those applications. The optical detection system may be applied to any of a number of applications as desired by the user.

The optical fibers and cables illustrated and described herein may be arranged in any desired configuration. For example, each of the fibers may be provided in a single length between elements, or in multiple lengths, as desired. In a specific example, fiber 160 in FIG. 3 connects to port 2 of optical circulator 320 through lead 315; however, it is understood that lead 315 may be part of fiber 160 if desired. Likewise, port 3 of optical circulator 320 and optical coupler 330 are connected through leads 317 and 322; however, it is understood that leads 317 and 322 may be part of the same length of optical fiber if desired.

Although the present invention has been described in connection with certain exemplary elements (e.g., the elements illustrated and described in connection with FIGS. 2-5) it is not limited to those elements. The optical detection system may use any of a number of types of components within the scope and spirit of the claims.

Although illustrated and described above with reference to certain specific embodiments, the present invention is nevertheless not intended to be limited to the details shown. Rather, various modifications may be made in the details within the scope and range of equivalents of the claims and without departing from the spirit of the invention.

What is claimed:

1. An optical detection system comprising:
a host node including (a) an optical source for generating optical signals, and (b) an optical receiver; and
a plurality of fiber optic sensors for converting at least one of vibrational and acoustical energy to optical intensity information, each of the fiber optic sensors including: (1) at least one length of optical fiber configured to sense at least one of vibrational and acoustical energy; (2) a reflector at an end of the at least one length of optical fiber; and (3) at least one field node for receiving optical signals from the host node, the field node transmitting optical signals along the at least one length of optical fiber, the field node receiving optical signals back from the at least one length of optical fiber, and the field node transmitting optical signals to the optical receiver of the host node,
wherein each of the plurality of fiber optic sensors includes at least one transducer, the at least one transducer including (1) a fixed member configured to be secured to a body of interest and (2) a moveable member, the at least one length of optical fiber wrapped for at least one turn around the fixed member and the moveable member.

2. The optical detection system of claim 1 wherein the optical source includes at least one of a light emitting diode and a laser.

3. The optical detection system of claim 1 wherein the optical source includes at least one of a superluminescent light emitting diode and an edge emitting light emitting diode.

4. The optical detection system of claim 1 wherein the optical source transmits optical signals as light energy in a continuous wave (CW) mode.

5. The optical detection system of claim 1 wherein the field node includes a linearized Sagnac interferometer.

6. An optical detection system comprising:
a host node including (a) an optical source for generating optical signals, and (b) an optical receiver; and
a plurality of fiber optic sensors for converting at least one of vibrational and acoustical energy to optical intensity information, each of the fiber optic sensors including: (1) at least one length of optical fiber configured to sense at least one of vibrational and acoustical energy; (2) a reflector at an end of the at least one length of optical fiber; and (3) at least one field node for receiving optical signals from the host node, the field node transmitting optical signals along the at least one length of optical fiber, the field node receiving optical signals back from the at least one length of optical fiber, and the field node transmitting optical signals to the optical receiver of the host node,
wherein the field node includes a linearized Sagnac interferometer, wherein the linearized Sagnac interferometer includes a 3×3 fiber optic coupler, a delay coil of optical fiber, a depolarizer, and a 2×2 fiber optic coupler.

7. The optical detection system of claim 6 wherein an output of the optical source is connected to a first input lead of the 3×3 fiber optic coupler, and wherein a second input lead of the 3×3 fiber optic coupler is connected to the optical receiver of the host node.

8. The optical detection system of claim 7 wherein a third input lead of the 3×3 fiber optic coupler is configured such that it does not support guiding light, and as such, reflected light can not travel along the third input lead back to the 3×3 fiber optic coupler, and wherein a lead of the delay coil is connected to an output lead of the 3×3 fiber optic coupler, and another lead of the delay coil is connected to an input lead of the 2×2 fiber optic coupler.

9. The optical detection system of claim 7 further comprising a lead cable between the host node and a first of the plurality of fiber optic sensors closest in proximity to the host node, the lead cable being connected to the field node of the first of the plurality of fiber optic sensors.

10. The optical detection system of claim 9 wherein a connection between the output of the optical source and the first input lead of the 3×3 fiber optic coupler, and a connection between the second input lead of the 3×3 fiber optic coupler and the optical receiver of the host node, are provided by the lead cable.

11. The optical detection system of claim 9 wherein a connection between the output of the optical source and the first input lead of the 3×3 fiber optic coupler is provided through a first optical circulator, and a connection between the second input lead of the 3×3 fiber optic coupler and the optical receiver of the host node is provided through a second optical circulator.

12. The optical detection system of claim 1 wherein the host node is configured to receive and interpret the optical intensity information from the plurality of fiber optic sensors, the host node being configured to (1) collect and save a set of data samples over a specified time window; (2) perform a Fourier Transform on the set of data samples within each time window to generate a series of spectra in time; (3) generate a spectral mask representing a vibration spectrum of a predetermined plurality of events; (4) compare spectra of the optical intensity information received from the plurality of fiber optic sensors to the spectral mask to ascertain whether the received optical intensity information exceeds the spectral mask within a time window.

13. The optical detection system of claim 1 wherein the at least one field node converts phase information received from the at least one length of optical fiber into intensity information.

14. The optical detection system of claim 1 wherein the field node includes a linearized Sagnac interferometer wherein the linearized Sagnac interferometer includes a 3×3 fiber optic coupler, a delay coil of optical fiber, a depolarizer, and a 2×2 fiber optic coupler.

15. A pipeline detection system comprising:
a host node in the vicinity of, or remote from, a pipeline to be monitored, the host node including an optical source for generating optical signals, and an optical receiver; and
a plurality of fiber optic sensors local to the pipeline to be monitored, the plurality of fiber optic sensors for converting at least one of vibrational and acoustical energy to optical intensity information, each of the fiber optic sensors including: (1) at least one length of optical fiber affixed along a portion of the pipeline to sense at least one of vibrational and acoustical energy; (2) a reflector at an end of the at least one length of optical fiber; and (3) a field node for receiving optical signals from the host node, the field node transmitting optical signals along the at least one length of optical fiber, the field node receiving optical signals back from the at least one length of optical fiber, and the field node transmitting optical signals to the optical receiver of the host node,
wherein each of the plurality of fiber optic sensors includes at least one transducer, the at least one transducer including (1) a fixed member configured to be secured to a body of interest and (2) a moveable member, the at least one length of optical fiber wrapped for at least one turn around the fixed member and the moveable member.

16. A mine detection system comprising:
a host node remote from a mine to be monitored, the host node including an optical source for generating optical signals, and an optical receiver; and
a plurality of fiber optic sensors local to the mine to be monitored, the plurality of fiber optic sensors for converting acoustical energy to optical intensity information, each of the fiber optic sensors including: (1) at least one length of optical fiber affixed along a portion of the mine to sense acoustical energy within the mine; (2) a reflector at an end of the at least one length of optical fiber; and (3) a field node for receiving optical signals from the host node, the field node transmitting optical signals along the at least one length of optical fiber, the field node receiving optical signals back from the at least one length of optical fiber, and the field node transmitting optical signals to the optical receiver of the host node,
wherein each of the plurality of fiber optic sensors includes at least one transducer, the at least one transducer including (1) a fixed member configured to be secured to a body of interest and (2) a moveable member, the at least one length of optical fiber wrapped for at least one turn around the fixed member and the moveable member.

17. A fence detection system comprising:
a host node in the vicinity of, or remote from, a fence to be monitored, the host node including an optical source for generating optical signals, and an optical receiver; and
a plurality of fiber optic sensors mounted along the fence to be monitored, the plurality of fiber optic sensors for converting vibrational energy to optical intensity information, each of the fiber optic sensors including: (1) at least one length of optical fiber affixed along a portion of the fence to sense vibrational energy; (2) a reflector at an end of the at least one length of optical fiber; and (3) a field node for receiving optical signals from the host node, the field node transmitting optical signals along the at least one length of optical fiber, the field node receiving optical signals back from the at least one length of optical fiber, and the field node transmitting optical signals to the optical receiver of the host node,
wherein each of the plurality of fiber optic sensors includes at least one transducer, the at least one transducer including (1) a fixed member configured to be secured to a body of interest and (2) a moveable member, the at least one length of optical fiber wrapped for at least one turn around the fixed member and the moveable member.

18. An underground detection system comprising:
a host node in the vicinity of, or remote from, an underground area to be monitored, the host node including an optical source for generating optical signals, and an optical receiver; and
a plurality of fiber optic sensors local to the underground area to be monitored, the plurality of fiber optic sensors for converting vibrational energy to optical intensity information, each of the fiber optic sensors including: (1) at least one length of optical fiber buried along a portion of the perimeter to sense vibrational energy; (2) a reflector at an end of the at least one length of optical fiber; and (3) a field node for receiving optical signals from the host node, the field node transmitting optical signals along the at least one length of optical fiber, the field node receiving optical signals back from the at least one length of optical fiber, and the field node transmitting optical signals to the optical receiver of the host node,
wherein each of the plurality of fiber optic sensors includes at least one transducer, the at least one transducer including (1) a fixed member configured to be secured to a body of interest and (2) a moveable member, the at least one length of optical fiber wrapped for at least one turn around the fixed member and the moveable member.

19. An underwater detection system comprising:
a host node in the vicinity of, or remote from, a body of water to be monitored, the host node including an optical source for generating optical signals, and an optical receiver; and
a plurality of fiber optic sensors within or under the body of water to be monitored, the plurality of fiber optic sensors for converting acoustic energy to optical intensity information, each of the fiber optic sensors including: (1) at least one length of optical fiber suspended in the water or buried under the water to sense acoustic energy; (2) a reflector at an end of the at least one length of optical fiber; and (3) a field node for receiving optical signals from the host node, the field node transmitting optical signals along the at least one length of optical fiber, the field node receiving optical signals back from the at least one length of optical fiber, and the field node transmitting optical signals to the optical receiver of the host node,
wherein each of the plurality of fiber optic sensors includes at least one transducer, the at least one transducer including (1) a fixed member configured to be secured to a body of interest and (2) a moveable member, the at least one length of optical fiber wrapped for at least one turn around the fixed member and the moveable member.

* * * * *